United States Patent [19]

Chen et al.

[11] 3,975,720
[45] Aug. 17, 1976

[54] FOOD THERMOMETER FOR MICROWAVE OVEN

[75] Inventors: David Y. Chen; Louis H. Fitzmayer, both of Louisville, Ky.

[73] Assignee: General Electric Company, Louisville, Ky.

[22] Filed: Sept. 23, 1975

[21] Appl. No.: 616,049

Related U.S. Application Data

[63] Continuation-in-part of Ser. No. 447,087, March 1, 1974, abandoned.

[52] U.S. Cl. .............................. 340/228 R; 73/352; 73/362 AR; 99/342; 99/421 TP; 219/10.55 E
[51] Int. Cl.² .................. G08B 21/00; G01K 1/08; G01K 7/24
[58] Field of Search ............... 73/352, 359, 362 AR; 99/342, 421 TP; 219/10.55 P, 10.55 E, 10.55 F, 10.55 R, 450; 340/227 R, 228 R, 227.1, 233; 333/73 C, 73 R

[56] References Cited
UNITED STATES PATENTS

| | | | |
|---|---|---|---|
| 2,557,567 | 6/1951 | Rumsey et al. | 333/73 C |
| 2,858,699 | 11/1958 | Scofield et al. | 73/352 |
| 3,089,407 | 5/1963 | Kinkle | 99/421 TP X |
| 3,177,335 | 4/1965 | Fitzmayer et al. | 219/10.55 |
| 3,271,651 | 9/1966 | Diederich | 73/359 |
| 3,511,958 | 5/1970 | Staats | 333/73 C X |
| 3,626,135 | 12/1971 | Fitzmayer | 333/73 C |
| 3,742,397 | 6/1973 | Fitzmayer | 333/73 C |
| 3,778,798 | 12/1973 | Heit | 340/228 R X |
| 3,786,220 | 1/1974 | Harnden | 219/450 X |
| 3,815,113 | 6/1974 | Welch | 340/228 R |
| 3,849,622 | 11/1974 | Merriam | 219/10.55 E |

OTHER PUBLICATIONS

Kaftanov, S. V. et al., *Measuring the Temp. of Granu-*
*lated Carbon in a High–Freq. Field,* In *Ind. Lab. (USA),* vol. 38, No. 11, (Nov. 1972), pp. 1723-1724.

*The A.R.R.L. Antenna Book,* c. 1960, The American Radio Relay League Inc. Chapter 3, pp. 106-108.

*Primary Examiner*—Richard C. Queisser
*Assistant Examiner*—Frederick Shoon
*Attorney, Agent, or Firm*—Steven C. Schnedler; Francis H. Boos; Richard L. Caslin

[57] ABSTRACT

Apparatus is disclosed for monitoring the internal temperature of food being cooked in the cooking cavity of a microwave oven with microwaves of a predetermined frequency having a predetermined wavelength λ. The apparatus includes a needle-like temperature-sensing probe adapted for insertion into the food being cooked, the probe including a thermally-responsive electrical element positioned internally of the probe housing near the tip end. A flexible shielded cable connects the probe to circuitry responsive to thermally-induced changes in a characteristic of the electrical element, the cable shield being connected at one end to the probe housing and at the other end to a wall of the cooking cavity. The total effective electrical length of the probe and the cable, measured along the cable and probe from the cooking cavity wall to the distal end of the probe, is selected to be an integer multiple of one-half the predetermined wavelength λ. Resonant conditions, high attendant induced currents along the probe and cable, and direct heating of the probe and cable by the microwave energy are thereby minimized.

12 Claims, 4 Drawing Figures

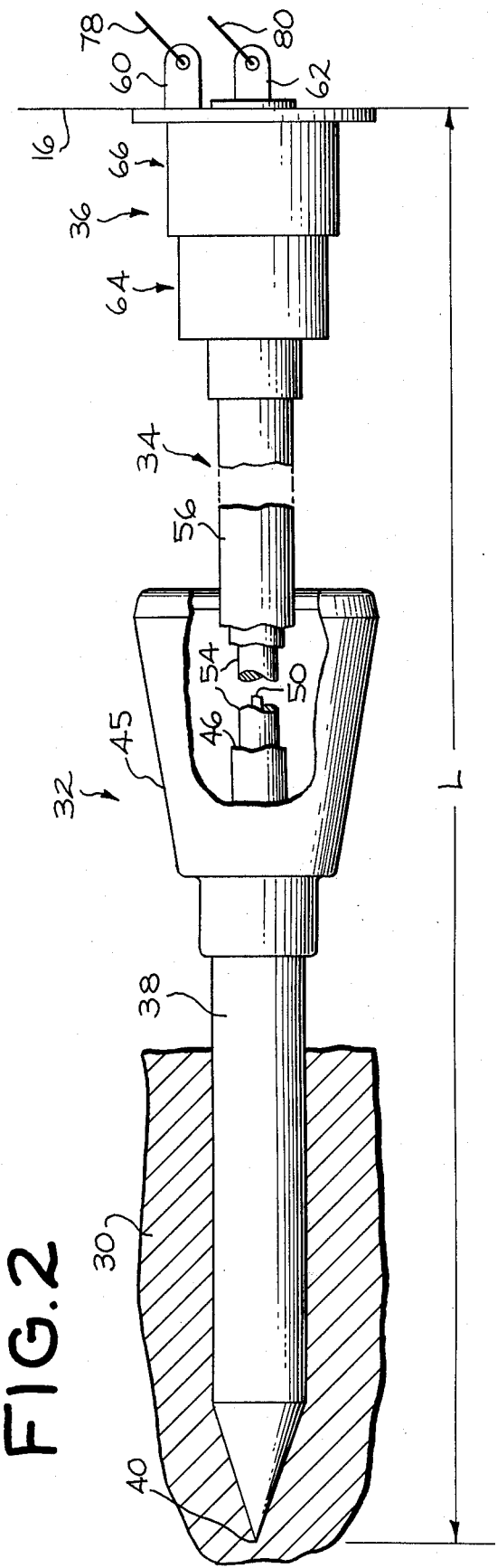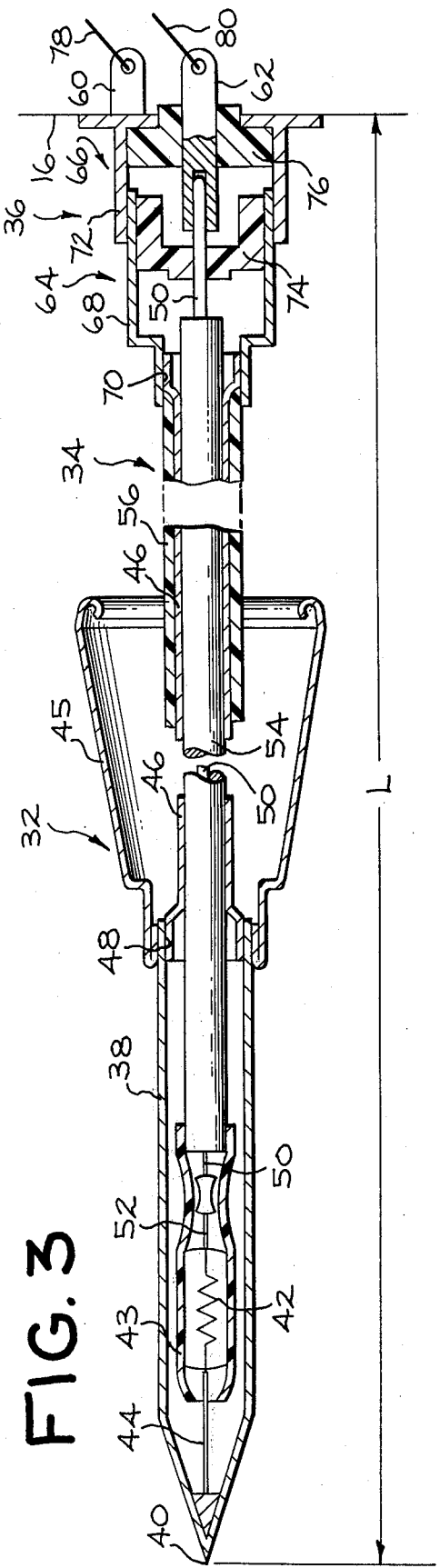

FOOD THERMOMETER FOR MICROWAVE OVEN

CROSS-REFERENCE TO RELATED APPLICATION

This is a continuation-in-part of application Ser. No. 447,087, filed Mar. 1, 1974, by David Y. Chen and Louis H. Fitzmayer, entitled "Food Thermometer For Microwave Oven," and assigned to the same assignee as the present invention, now abandoned.

BACKGROUND OF THE INVENTION

1. Field of the Invention

The present invention relates to temperature-monitoring apparatus and more particularly to such apparatus for monitoring the internal termperature of food being cooked in a microwave oven.

2. Description of the Prior Art

It is a desirable feature to include, in an oven, apparatus for monitoring the internal temperature of the food while it is being cooked. Such apparatus permits food to be cooked more accurately to a desired degree of doneness than would be the case either if a predetermined length of cooking time were employed or if a conventional mercury-type thermometer were employed. The former requires an accurate estimate of cooking time based upon oven temperature, in the case of a conventional oven, or upon microwave power level, in the case of a microwave oven, and, additionally, upon size and type of the food, in either a conventional or a microwave oven. The latter requires that the user of the oven periodically check the temperature reading, and is not readily adaptable for use in a microwave oven.

Electrical thermometers for monitoring internal temperature of food while it is being cooked have been developed for use in conventional ovens. Examples are disclosed in U.S. Pat. No. 3,778,798-Heit and U.S. Pat. No. 3,815,113-Welch. Electrical thermometers of the above-mentioned type comprise a needle-like probe adapted to be driven into the food, a temperature-sensing thermistor contained within the probe and located near the tip thereof, and a flexible cable connecting the probe to electrical circuitry within the oven, the electrical circuitry serving to either indicate the actual internal temperature of the food or to actuate a buzzer when a preset temperature is reached. In order that the electrical thermometer may be removed from the oven when it is not being used, the probe and cable are electrically connected to the electrical circuitry through a connector mounted on an interior wall of the oven cooking cavity.

Electric thermometer probes of the above-described type operate well in a conventional gas or electric oven. However, such probes, designed for use in a conventional oven, do not operate well when used in a microwave oven. The desired heating of food in a microwave oven occurs when the food, which is placed in the cooking cavity of the oven, "loads" or absorbs microwave energy, converting the energy into heat. Undesirably, food temperature-sensing probes of the conventional type also "load" in a microwave oven. This results in undesired high electrical currents flowing along the probe and cable and consequent undesired heating of the probe and cable. In particular, "hot spots" are produced at particular points along the cable and probe. This heating of the probe by direct action of the microwave energy, rather than solely be heat conducted from the food which is being cooked, causes the thermistor to sense a temperature which is higher than the actual internal temperature of the food. This results in a premature indication of doneness, a serious deficiency. Additionally, direct heating of the cable and the connector mounted on the interior wall of the cooking cavity results in a higher cable and connector temperature than would otherwise be the case. Such higher temperature can shorten the life span of the cable and the connector and may make them uncomfortably hot for the user of the oven to handle.

Such problems when a conventional temperature-sensing probe is used in a microwave oven can be minimized, but not eliminated, by measures such as providing the best possible thermal contact between the food being cooked and the probe so that heat produced in the probe by direct action of the microwave energy is dissipated as much as is possible into the food, or operating the oven at a lower microwave power level when the probe is being used. However, such measures are a compromise at best because some self-heating of the cable and probe still results and, further, the use of a lower microwave power level lengthens the required cooking time.

One of the disadvantages of a conventional electrical thermometer probe, when used in a microwave oven, is most evident when the probe is placed in the oven and the microwave energy turned on with no food load present. While such operation is contrary to the normal and suggested use of a microwave oven, it is a definite possibility that some users may inadvertently operate the oven in this manner. Under such conditions, rapid heating of the cable and probe assembly results.

One approach to monitoring the temperature of a substance being heated in a high-frequency field is disclosed in an article by Kaftanov, S. D., et al., "Measuring the Temperature of Granulated Carbon Material in a High-Frequency Field," Ind. Lab. (USA), Vol. 38, No. 11, (Nov. 1972), pp 1723–1724.

The article discusses some problems caused by direct heating of a temperature-sensing thermocouple by high-frequency energy. Additionally, the Kaftanov article discusses particular problems caused by arcing between adjacent carbon particles and between the probe tip and the carbon particles, which problems would not normally be present when the internal temperature of cooking food is being monitored. The Kaftanov article discloses a special thermocouple probe which includes a graphite screen filled with liquid tin to shield the thermocouple from direct heating by the high-frequency energy and to minimize arcing. Further, to shield the indicating circuitry from high-frequency interference, a special high-frequency filter comprising two shorted and two open-circuited sections of a coaxial quarter wavelength cable is inserted in series with each of the two thermocouple leads and three LC sections in series are connected to the case of the indicating circuitry just before the thermocouple lead terminals. Such apparatus is complex and not readily adaptable for monitoring the internal temperature of food being cooked in a microwave oven.

U.S. Pat. No. 3,177,335-Fitzmayer et al. discloses a thermostat probe for measuring the ambient temperature in an oven of the type which cooks food using either conventional radiant energy or microwave energy, or both. The thermostat probe is used to control the operation of the conventional radiant heating energy elements. The thermostat is of the hydraulic type having a capillary tube leading into the oven cavity and terminating in a temperature-sensing bulb. It is necessary that the thermostat probe be insensitive to microwave energy and to respond only to ambient temperature within the oven cooking cavity. To this end, the probe is supported by a support having a plurality of spaced grounded points, the spacing between the grounding points being different than one quarter of the wavelength of the microwave energy or any odd multiple of one quarter wavelength of the microwave energy, so as to prevent the thermostat probe from creating a series-resonant loop at the frequency of the microwave energy. Such a configuration, relying upon a plurality of spaced grounding points, would not be suitable for a food temperature-sensing probe and cable assembly which, as a practical matter, is connected to the cooking cavity wall only at one end and to the food at the other end.

By the present invention, there is provided simple and effective temperature-monitoring apparatus for monitoring the internal temperature of food while it is being cooked in a microwave oven, which apparatus avoids the deficiencies of the prior art. In particular, direct heating of the probe and cable by the microwave energy is minimized, thereby producing a more accurate indication of doneness.

SUMMARY OF THE INVENTION

It is an object of the invention to provide electrical apparatus of the probe and cable type for accurately monitoring the internal temperature of food while it is being cooked in a microwave oven.

It is another object of the invention to provide such apparatus which minimizes heating of the probe and of the cable by direct action of the microwave energy, thereby avoiding a premature indication of doneness.

It is still another object of the invention to provide such apparatus which minimizes heating of the probe and cable assembly when the microwave oven is inadvertently operated without food being placed in the oven.

These and other objects are accomplished by apparatus according to the present invention, which apparatus includes a temperature-sensing probe adapted for insertion into the food being cooked, the probe including an elongated conductive housing, the distal end of which is closed and shaped to facilitate insertion into the food and the probe further including a thermally-responsive electrical element positioned internally of the housing near the distal end. Apparatus, according to the invention, further includes circuitry responsive to thermally-induced changes in a characteristic of the electrical element included in the probe, the circuitry producing a control effect indicative of the internal temperature of the food. A flexible shielded cable connects the electrical element to the circuitry, the cable shield being electrically connected at one end to the probe housing and at the other end to a wall of the cooking cavity. The total effective electrical length of the probe and the cable, measured along the cable and probe from the cooking cavity wall to the distal end of the probe, is selected to be approximately equal to $n\lambda/2$, where $n$ is any integer and $\lambda$ is the wavelength of the microwaves being used to cook the food in the oven. When the total length of the cable and probe is so selected, and one of the cable shield is connected to a wall of a cooking cavity, resonant conditions and attendant high induced currents along the probe and cable shield caused by the microwave energy are minimized. As a result, the probe and cable assembly may successfully be operated in a microwave oven while maintaining the accuracy of the food temperature indication.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

FIG. 2 is an enlarged, elevational view of the temperature-sensing probe and cable structure of one embodiment of the present invention with a part of the cable removed.

FIG. 3 is a view in vertical section of the probe and cable structure illustrated in FIG. 2.

DESCRIPTION OF THE PREFERRED EMBODIMENTS

Figure 1:
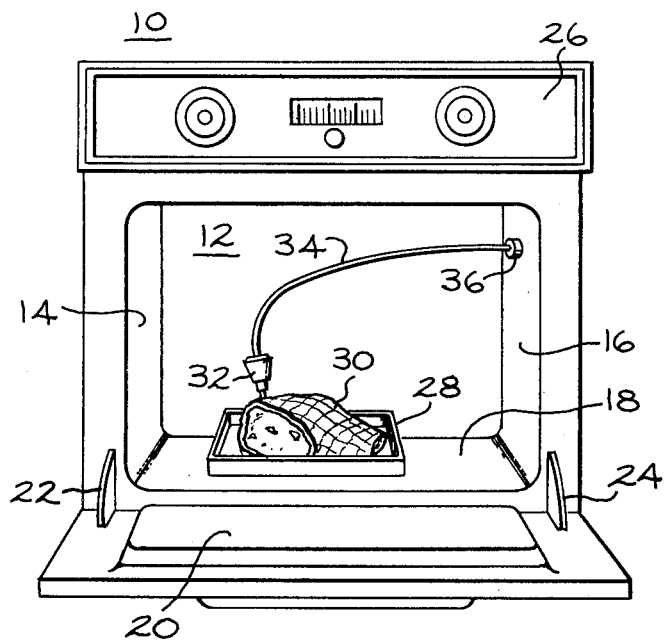
FIG. 1 is a front elevational view of a microwave oven shown with the oven door open and illustrating the shielded cable and a portion of the probe of food temperature-monitoring apparatus constructed in accordance with and embodying features of the present invention.

Referring first to FIG. 1, there is illustrated a microwave oven, generally designated by the numeral 10, including a food temperature-monitoring system constructed in accordance with and embodying features of the present invention. The oven 10 is a standard microwave oven and, while a built-in wall oven is shown for purposes of illustration, it will be understood that any desired type of microwave oven, such as a countertop microwave oven, may be used. The oven 10 includes a cooking cavity generally designated at 12, defined by side walls 14 and 16, a top wall (not shown), a bottom 18, and a door 20. The door 20 is hingedly supported at the bottom by hinges 22 and 24 and preferably includes a sealing means (not shown) around the periphery thereof to prevent the escape of microwave energy from the cooking cavity 12. The oven 10 further includes a control panel 26.

As is conventional, the oven 10 is also provided with a magnetron (not shown) for generating microwaves of a predetermined frequency, preferably at a nominal frequency of 2450 MHz, but within the band of between 2415 MHz and 2485 MHz, as is permitted by current FCC regulations. The oven 10 further includes a conventional waveguide (not shown) for transmitting the microwave energy from the output of the magnetron to the interior of the cooking cavity 12.

Within the cooking cavity 12, there is shown a shallow container 28 constructed of a material transparent to microwaves, such as a Pyrex dish, containing therein a piece of food 30 shown for purposes of illustration as a half of a ham. The ham 30 is to be cooked to an internal temperature of approximately 150°F. The cooking time required to heat the food 30 to the desired internal temperature is subject to many variables, for example, size and weight of the food, fat and bone content of the particular piece, and type of food. This variable cooking time, and the fact that the cooking time can only be estimated, is inconvenient and makes it difficult to accurately cook the food to a desired degree of doneness when there is no means for monitoring the internal temperature of the food while it is being cooked.

Apparatus according to the invention includes a temperature-sensing probe 32 inserted into the ham 30 and a flexible shielded cable 34, the shield of the cable 34 being electrically connected at one end to the probe 32 and electrically connected at the other end through a connector 36 to the cooking cavity side wall 16.

Referring now to FIGS. 2 and 3, constructional details of the probe 32, the flexible shielded cable 34, and the connector 36 are shown. The probe 32 includes an elongated conductive housing 38 having a distal end 40 which is closed and shaped to facilitate insertion into the food 30. The probe 32 further includes a thermally-responsive electrical element such as a thermistor 42 positioned internally of the housing 38 near the distal end 40. The thermistor 42 is supported within a shrinkable sleeve 43. A first lead 44 of the thermistor 42 is electrically and thermally connected to the probe housing 38 adjacent the distal end 40. As is conventional, heat conduction to the thermistor 42 is primarily along the first lead 44. The probe 32 may be provided with a handle 45 which preferably is made of an insulating material.

The flexible shielded cable 34 is shown as a coaxial cable in FIGS. 2 and 3 and has an electrically conductive cable shield 46 electrically connected at one end to the probe housing 38 at a point 48. This connection may be a crimp. Since the thermistor lead 44 is also connected to the probe housing 38, the cable shield 46 is electrically connected through the probe housing 38 to the thermistor lead 44. The cable 34 also includes an inner conductor 50 which is electrically connected to a second thermistor lead 52. The inner conductor 50 of the cable 34 is separated from the cable shield 46 by a layer of dielectric insulating material 54. Preferably, the cable shield 46 is surrounded by a layer of insulation 56, which may, for example, be a material such as polytetrafluorethylene, commonly sold under the trademark Teflon.

At the other end of the cable 34, the cable shield 46 is electrically connected through the connector 36 to the cooking cavity side wall 16 and to a terminal 60. The inner conductor 50 of the cable 34 is connected through the connector 36 to a terminal 62. Conventionally, the connector 36 includes a plug 64 and a receptacle 66. The plug 64 comprises an electrically-conductive shell 68 which is connected to the cable shield 46 at a connection point 70 and which mates with a corresponding electrically-conductive receptacle shell 72, the receptacle shell 72 being electrically connected both to the cooking cavity side wall 16 and to the terminal 60. The connection at point 70 may also be a crimp. As is conventional, the cooking cavity side wall 16 and, therefore, the terminal 60, the cable shield 46, and the probe housing 38 are all connected to a circuit reference point, for example, "ground." Disposed within the plug 64 and receptacle 66 are insulating bodies 74 and 76, respectively, for supporting the inner conductor 50 and the terminal 62. Leads 78 and 80 electrically connect the terminals 60 and 62 to circuitry (FIG. 4) responsive to thermally-induced changes in the resistance of the thermistor 42.

It will be apparent that the leads 78 and 80 are electrically connected through the connector 36, the cable 34, and the probe housing 38 to the thermistor leads 44 and 52. Additionally, the thermistor 42 is completely encased in a continuous conductive sheath including the probe housing 38 and the cable shield 46 so as to be shielded from direct heating by microwave energy. The connection 48 between the probe housing 38 and the cable shield 46 and the connection 70 between the cable shield 46 and the plug shell 68 are sufficient to provide a low-resistance electrical connection and to prevent the passage of microwave energy through any small gap which may occur at the connection points 48 and 70. Crimped connections, in which actual electrical connection is made at a plurality of closely spaced points, have been found to be sufficient.

Figure 4:
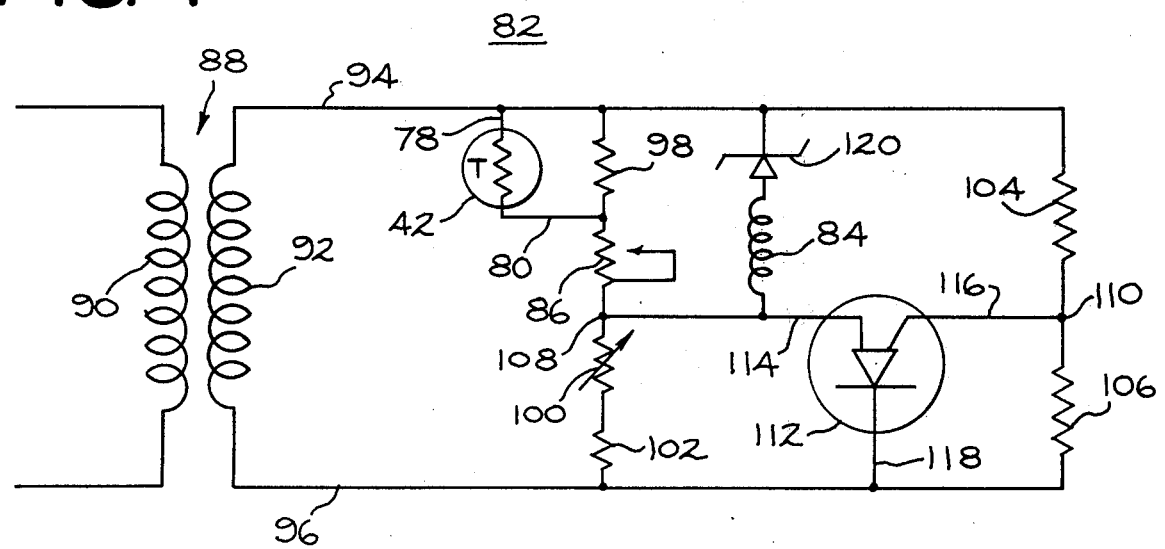
FIG. 4 is a schematic circuit diagram of circuitry which may be used in one embodiment of the present invention to produce a control effect indicative of the internal temperature of the food.

While in FIGS. 2 and 3 the flexible shielded cable 34 is shown as a coaxial cable, it will be understood that, according to the invention, any type of shielded cable may be used with equal effectiveness, so long as there is a substantially continuous conductive layer surrounding the thermistor 42 and connected to the cooking cavity side wall 16. A coaxial cable is used only as a matter of convenience in a preferred embodiment of the invention because the cable shield 46 may be employed as one of the conductors for electrically connecting the first lead 44 of the thermistor 42 to the circuitry (FIG. 4). However, the flexible shielded cable 34 may alternatively be a two-conductor shielded cable having two inner conductors and an outer shield, in which case the two inner conductors would be electrically connected to the thermistor leads 44 and 52 and the cable shield 46 would not be employed as one of the conductors for electrically connecting the thermistor 42 to the circuitry (FIG. 4). Another possible alternative construction for the shielded cable 34 would be a flexible hollow tubular cable shield and a single inner conductor passing therethrough, but not necessarily centered axially in the cable 34. The cable shield would be employed as one of the thermistor conductors. The cable dielectric insulation material 54 would not, if such a configuration were employed, completely fill the space within the cable shield 46. However, the essential requirements that the thermistor be shielded from microwave energy, that the cable shield be connected to the cooking cavity side wall 16, and that an electrical connection be made between the thermistor 42 and the circuitry (FIG. 4) would be satisfied.

As discussed above, microwave energy at a predetermined nominal frequency of 2450 MHz is supplied to the interior of the cooking cavity 12. For such predetermined frequency, there is a corresponding predetermined wavelength $\lambda$. For microwaves of, for example, 2450 MHz, $\lambda$ equals 4.82 inches in free space. It will be appreciated that not all of the microwave energy within the cooking cavity 12 is at a frequency of 2450 MHz due to the presence of harmonics of the operating frequency and due to the frequency tolerance permitted. However, microwave energy is predominantly present within a frequency band centered on 2450 MHz. Alternatively, the predominant microwave frequency may be 915 MHz.

In accordance with the invention, the total effective electrical length of the probe 32 and the cable 34, measured along the cable 34 and probe 32 from the cavity wall 16 to the distal end 40 of the probe 32, is selected to be approximately equal to $n\lambda/2$, where $n$ is any integer. It has been found experimentally that apparatus according to the invention is most effective when the total electrical length, measured as described above, is kept within the tolerance range of $n \lambda/2 \pm \lambda/20$. It is believed that substantial benefits of the invention may still be obtained if the length is controlled to be within the range of $n \lambda/2 \pm \lambda 8$.

It will be apparent to those skilled in the art that the electrical length of the probe and cable assembly may not be exactly the same as the actual physical length, (designated L in FIGS. 2 and 3). This is due, in part, to the effect of cable and probe diameter, to "end effects," and to the fact that the velocity of microwaves propagating along the cable and probe may be different than the velocity in the free space. As a result of these effects, and possibly others, a wavelength along the cable and probe may vary slightly from the predicted free space wavelength. The precise physical length L required is not amenable to calculation, but is readily obtainable experimentally, the experimentation required being well within the skill of one skilled in the art. For example, an experimental starting point would be a physical length L equal to nine half wavelengths in free space: $9 \lambda/2 = (9/2) (4.82 \text{ inches}) = 21.69$ inches. The cable and probe length L is varied slightly about this point, while observing the degree of direct heating of the probe and cable by the microwave energy for each experimental length. For one particular probe and cable assembly in a particular microwave oven, an optimum length L was found to be 21.85 inches. It should also be kept in mind that, due to the microwave frequency tolerance permitted, $\lambda$ (in free space) may vary from 4.89 inches at a frequency of 2415 MHz to 4.75 inches at a frequency of 2485 MHz.

Referring now to FIG. 4, there is shown circuitry, generally designated at 82, responsive to thermally-induced changes in the resistance of the thermistor 42 to produce a control effect indicative of the internal temperature of the food 30. It will be understood that the circuitry 82 is exemplary only and may be any circuitry responsive to thermally-induced changes in a characteristic of the electrical element 42. The control effect may be, for example, the actuation of an audible alarm, the de-energizing of the microwave energy, or both. The particular circuitry 82 is that which is disclosed in the above-mentioned U.S. Pat. No. 3,778,798-Heit. While a brief description of the circuitry 82 follows, reference is hereby made to the above-mentioned U.S. Pat. No. 3,778,798-Heit for a more detailed description and explanation of the operation of the circuitry 82.

The circuitry 82 operates to energize a buzzer 84 when the temperature sensed by the thermistor 42 reaches a preset temperature, the preset temperature being determined by the setting of a potentiometer 86. The circuitry 82 includes a voltage stepdown transformer 88 having a primary winding 90 for connection to 115 volt, 60 Hz power source, and producing, across a secondary winding 92, 24 volt AC power. Conductors 94 and 96 are connected across the secondary winding 92. A four-leg impedance bridge network comprising, in the first leg, a resistor 98 and the potentiometer 86; in the second leg, resistors 100 and 102; in the third leg, a resistor 104; and, in the fourth leg, a resistor 106, is connected between the conductors 94 and 96. The thermistor 42 is electrically included in the first leg by being connected, through the conductors 78 and 80, in parallel with the resistor 98. The bridge network further includes comparison terminals 108 and 110 at the junction of the first and second legs and at the junction of the third and fourth legs, respectively. A programmable unijunction transmistor (PUT) 112 is connected between the comparison terminals 108 and 110 to serve as a threshold detector for the bridge network, the anode 114 of the PUT 112 being connected to the comparison terminal 108 and the gate 116 of the PUT 112 being connected to the comparison terminal 110. The cathode 118 of the PUT 112 is connected to the conductor 96. The buzzer 84 is connected in series with a zener diode 120 between the anode 114 and the conductor 94.

The thermistor 42 has a negative temperature coefficient so that when the sensed temperature is equal to or greater than the preset temperature, during positive half cycle AC line excursions (when the conductor 94 is positive with reference to the conductor 96) the anode 114 is biased positive with respect to the gate 116, causing the PUT 112 to become forward biased. Current then flows from the conductor 94, through the zener diode 120, through the buzzer 84 and through the anode-cathode junction of the PUT 112, to the conductor 96, thereby energizing the buzzer 84. Alternatively, the buzzer 84 may be replaced by the coil of a relay having contacts arranged to de-energize the source of microwave energy when the temperature sensed by the thermistor 42 reaches or exceeds the preset temperature.

Having described a preferred embodiment of the invention, its operation will now be described. The theory of operation, hereinafter described, is that which is at present believed properly applicable to the invention, but it is not intended to be binding. The combination of the probe housing 38 and the cable shield 46 may be considered as a single conductor which is connected at one end to the cavity wall 16. If the electrical length of such conductor is chosen to be a quarter wavelength, or an odd integer multiple of a quarter wavelength, then the conductor would behave as a resonant antenna having a low impedance at the end connected to the oven wall and a high impedance at the free end. This is analogous to the fact that a quarter wavelength antenna normally exhibits a low impedance at one end and a high impedance at the other end. A resonant condition would exist therefore, leading to high standing wave currents and voltages along the length of the conductor and heating thereof.

If, however, the length is chosen to be an integer multiple of a half wavelength, such is not the case. In the case of an analogous resonant half wavelength antenna in free space, the end points of the antenna exhibit a high impedance and standing waves with attendant high voltage and current exist along the antenna. When, in accordance with the principles of the invention, one end of the half wavelength conductor is connected to the oven cavity wall, thereby forcing the one end to be at a low impedance, a mismatch condition results, preventing a resonant condition.

It will be appreciated that there are slight variations in the electrical length of the probe and cable and therefore variations in the degree of non-resonance in the cable and probe with variations in operating conditions. Examples of variable operating conditions are the precise location of the probe in the oven, whether there are loops in the cable, and the impedance of the food load. However, by selecting the total length of the cable 34 and the probe 32 to be an integer multiple of a half wavelength, the likelihood of a resonant condition occurring is minimal under expected operating conditions.

In the embodiment of FIGS. 2 and 3, the outer insulation 56 of the cable 34 extends only between the connector 36 and the probe housing 38, this insulation preventing accidental arcing if the cable 34 comes into contact or comes near one of the cooking cavity walls. Since the probe housing 38 is assumed to be embedded in the food load 30, no insulation thereof is needed. In this embodiment, the probe housing 38 is preferably constructed of stainless steel.

As an alternative, both the cable 34 and the probe housing 38 may be enclosed in a continuous sheath of insulation. In addition to insuring complete insulation of the cable and the probe housing, this alternative arrangement also permits the use of less-expensive aluminum or brass for the construction of the probe housing instead of stainless steel, aluminum having the additional advantage of being a much better electrical and thermal conductor than stainless steel. The alternative embodiment in which the probe housing is enclosed in a sheath of insulation forms no part of the present invention but, rather, is the sole invention of David Y. Chen and is the subject matter of application Ser. No. 603,126, filed Aug. 8, 1975, by David Y. Chen, entitled "Coating for Microwave Oven Temperature Probe," and assigned to the same assignee as the present invention. The above-mentioned application Ser. No. 603,126 discloses and claims an insulated probe housing in greater detail.

From the foregoing, it can be seen that there has been provided an improved food thermometer system which is particularly adapted for use in a microwave oven. More particularly, there has been provided a food thermometer system of simple and economical construction which functions to accurately monitor the internal temperature of the food being cooked, while preventing interference with the operation of the food thermometer system by the microwave energy.

Specifically, there has been provided an improved temperature-monitoring apparatus which includes a thermally-responsive electrical element disposed internally of an elongated conductive probe housing adapted for insertion into the food being cooked and connected by a shielded cable to electrical circuitry, the thermally-responsive electrical element being completely shielded from microwave energy, and the length of the cable and probe being selected to be an integer multiple of a half wavelength long so as to minimize resonant currents in the cable and probe and resultant heating.

Additionally, there has been provided alternative forms of the probe housing and cable whereby only the cable or, alternatively, both the cable and the probe housing may be provided with a sheath of electrical insulating material. As mentioned above, this alternative form of the probe housing forms no part of the subject matter of the present invention but is the subject of application Ser. No. 603,126.

While specific embodiments of the invention have been illustrated and described herein, it is realized that modifications and changes will occur to those skilled in the art. It is therefore to be understood that the appended claims are intended to cover all such modifications and changes as fall within the true spirit and scope of the invention.

What is claimed is:

1. Apparatus for monitoring the internal temperature of food being cooked in the cooking cavity of a microwave oven with microwaves of a predetermined frequency having a predetermined wavelength $\lambda$, said apparatus comprising:
   a. a temperature-sensing probe adapted for insertion into the food to be cooked, said probe including an elongated, conductive housing, the distal end of which is closed and shaped to facilitate insertion into the food, and said probe further including a thermally-responsive electrical element positioned internally of the housing near the distal end;
   b. circuitry responsive to thermally-induced changes in a characteristic of said electrical element to produce a control effect indicative of the food temperature; and
   c. a flexible shielded cable connecting said electrical element to said circuitry, the cable shield being electrically connected at one end to said probe housing and at the other end to a wall of the cooking cavity, the total effective electrical length of said probe and said cable, measured along the cable and probe from said cavity wall to the distal end of said probe, being approximately equal to $n\lambda/2$, where $n$ is any integer, whereby in use the combination of said shielded cable and said probe is non-resonant at said predetermined wavelength $\lambda$ and said electrical element is completely shielded from microwave energy.

2. The apparatus of claim 1, wherein said thermally-responsive electrical element has a first lead connected to said conductive housing adjacent the distal end of said housing, and a second lead connected to an inner conductor of said cable.

3. The apparatus of claim 2, wherein said flexible shielded cable is a coaxial cable.

4. The apparatus of claim 1, wherein said temperature-sensing element is a thermistor.

5. The apparatus of claim 1, wherein said circuitry responsive to thermally-induced changes in a characteristic of said electrical element produces an output signal when the internal temperature of the food reaches or exceeds a preset temperature.

6. The apparatus of claim 5, wherein the output signal produced when the internal temperature of the food reaches or exceeds the preset temperature is used to de-energize the source of microwave energy in the oven.

7. The apparatus of claim 1, wherein the predetermined microwave frequency is approximately 2450 MHz and the predetermined wavelength $\lambda$ is approximately 4.82 inches.

8. The apparatus of claim 1, wherein the cable shield is surrounded by a layer of dielectric insulation.

9. The apparatus of claim 1, wherein said conductive housing is constructed of stainless steel.

10. Apparatus for monitoring the internal temperature of food being cooked in the cooking cavity of a microwave oven with microwaves of a predetermined frequency having a predetermined wavelength $\lambda$, said apparatus comprising:
   a. temperature-sensing probe adapted for insertion into the food to be cooked, said probe including an elongated, conductive housing, the distal end of which is closed and shaped to facilitate insertion into the food and said probe further including a thermally-responsive electrical element positioned internally of the housing near the distal end;
   b. circuitry responsive to thermally-induced changes in a characteristic of said electrical element to produce a control effect indicative of the food temperature; and c. a flexible shielded cable connecting said electrical element to said circuitry, the cable shield being electrically connected at one end to said probe housing and at the other end to a wall of the cooking cavity, the total effective electrical length of said probe and said cable, measured along the cable and probe from said cavity wall to the distal end of said probe, being within the range of from about $n \lambda/2 - \lambda/8$ to $n \lambda/2 + \lambda/8$, where $n$ is any integer, whereby in use the combination of said shielded cable and said probe is nonresonant at said predetermined wavelength $\lambda$ and said electrical element is completely shielded from microwave energy.

11. The apparatus of claim 10, wherein the total effective electrical length of said probe and said cable is within the range of from $n \lambda/2 - \lambda/20$ to $n \lambda/2 + \lambda/20$.

12. Apparatus for monitoring the internal temperature of low impedance food being cooked in a microwave oven with microwaves of a predetermined wavelength, said apparatus comprising a coaxial transmission line having an outer conductor grounded at one end thereof to the associated oven and an inner conductor, temperature-sensing means connected between the inner and outer conductors of said coaxial transmission line at the other end thereof, a conductive housing adapted for insertion into the food being cooked and connected to said grounded outer conductor of said transmission line adjacent to said other end thereof for cooperation therewith to surround said temperature-sensing means and shield it from microwave energy, and indicator means coupled to said coaxial transmission line at said one end thereof and responsive to said temperature-sensing means for producing a signal indicative of the interior temperature of the associated food, the effective electrical distance from said one end of said transmission line to the distal end of said housing being approximately equal to $n \lambda/2$ where $n$ is any integer and $\lambda$ is said predetermined wavelength, whereby in use the combination of said transmission line and said housing is non-resonant at said predetermined wavelength and said temperature-sensing means is completely shielded from microwave energy.

* * * * *

UNITED STATES PATENT OFFICE
CERTIFICATE OF CORRECTION

PATENT NO. : 3,975,720
DATED : August 17, 1976
INVENTOR(S) : DAVID Y. CHEN and LOUIS H. FITZMAYER It is certified that error appears in the above-identified patent and that said Letters Patent are hereby corrected as shown below:

In column 7, line 4, "$\lambda 8$" should read -- $\lambda/8$ --.

Signed and Sealed this fifth Day of July 1977

[SEAL]

Attest:

RUTH C. MASON
*Attesting Officer*

C. MARSHALL DANN
*Commissioner of Patents and Trademarks*